(No Model.)

G. McDOUGALL.
CULTIVATOR.

No. 591,287. Patented Oct. 5, 1897.

WITNESSES:

INVENTOR
G. McDougall.
BY
ATTORNEYS.

UNITED STATES PATENT OFFICE.

GEORGE McDOUGALL, OF CEDAR JUNCTION, KANSAS.

CULTIVATOR.

SPECIFICATION forming part of Letters Patent No. 591,287, dated October 5, 1897.

Application filed December 2, 1896. Serial No. 614,175. (No model.)

*To all whom it may concern:*

Be it known that I, GEORGE MCDOUGALL, of Cedar Junction, in the county of Johnson and State of Kansas, have invented a new and Improved Cultivator, of which the following is a full, clear, and exact description.

The object of my invention is to provide a cultivator especially adapted for the cultivation of listed corn and to construct the cultivator in such a manner that the disks employed for cultivating purposes may be brought at any desired angle to the row of corn under cultivation, and whereby the shifting of the cultivator-disks may be expeditiously and conveniently accomplished without the driver or attendant of the machine dismounting therefrom and while the machine is in motion.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both figures.

Figure 1:
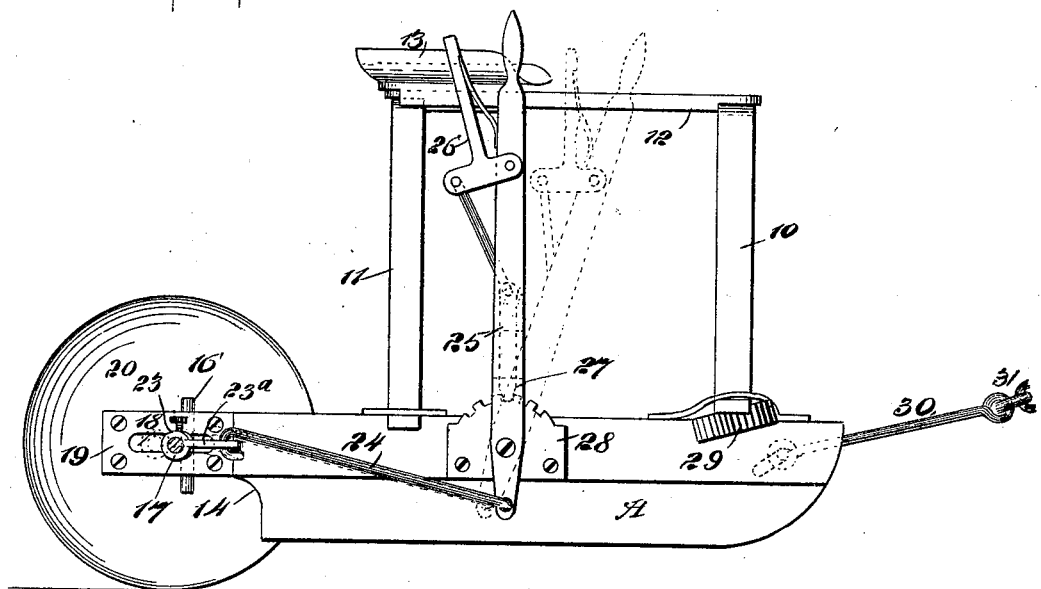
Figure 2:
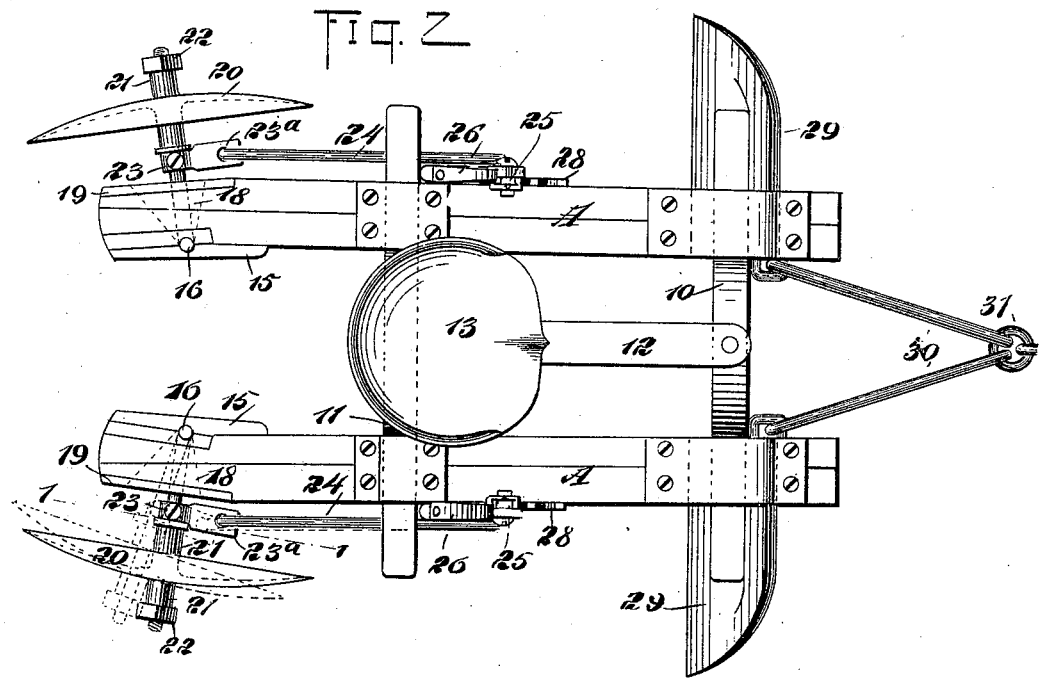

Figure 1 is a side elevation of the cultivator, one of the cutter-shafts being in section and the said section being taken on the line 1 1 of Fig. 2; and Fig. 2 is a plan view thereof.

The body of the cultivator consists of two runners A, placed in parallel order, their forward ends being beveled or rounded off, and the said runners are connected by two arches 10 and 11, the arch 10 being placed near the front and the arch 11 between the center and the rear end of the runners. These arches are connected by a top bar 12, upon which the seat 13 is placed, preferably in an adjustable manner, and each arch is provided with a foot that is secured to the top of the runners, and the feet of the said arches may be made to extend beyond the outer side faces of the runners. Each runner at its rear end is provided with a longitudinal recess 14, whereby the rear extremities of the runners are lessened in vertical thickness and the recesses are produced at a point near the longitudinal center of the runners and extend through the bottom edges of the same, as is best shown in Fig. 1.

The rear extremities of the runners are given an inward inclination, as shown in Fig. 2, and a box 15 is secured to the inner face of each runner at its recessed portion, the boxes having the same inclination as the runners, and preferably these boxes are made in two sections, secured together by screws, bolts, or their equivalents. Each box has a vertical and a horizontal opening made therein, the two openings connecting, whereby the T-head 16 of a spindle 17 may be journaled in each of the boxes.

An angular recess 18 is horizontally made in the rear portion of each runner, the apexes of the said recesses connecting with the horizontal openings in the boxes of the said runners or the openings through which the spindles 17 pass, as shown in dotted lines in Fig. 2. A wear-plate 19 is attached to the outer face of the rear portion of each runner, and each wear-plate is provided with a slot of like dimensions as the outer end of the slots 18 in the runners. The same bolts are usually employed to secure a box 15 and opposing wear-plate to a runner. The spindles 17 extend some distance beyond the outer side faces of the runners, and upon each spindle a disk cultivator 20 is mounted to loosely turn. The inner faces of these cultivators are concaved and their outer faces convexed. Each disk cultivator is provided with a hub 21, which extends beyond both its inner and outer faces, and the disk cultivators are held on their spindles, preferably by screwing nuts 22 on the outer ends of the spindles, which are threaded. These nuts are brought to an engagement with the outer ends of the hubs of the cultivators, while the inner ends of the hubs are made to engage with sleeves 23, one of the said sleeves being secured firmly on each spindle, preferably by a set-screw, as shown in Fig. 2, and each sleeve has a forwardly-projecting arm 23ª.

A connecting-bar 24 is pivotally attached to the arm of each sleeve 23, and the said connecting-bars are carried forwardly near each runner to a pivotal connection with the lower end of the lever 25. Two of these levers are employed, being pivoted one to the outer face of each runner. The levers 25 extend upward within convenient reach of the driver's seat, and each lever is provided with a thumb-latch 26, attached to a pawl 27, arranged to enter a rack 28, a rack being employed for each lever.

Arms 29 extend outward horizontally from the outer faces of the runners, and these arms are preferably located beneath the feet of the forward arch 10, and the said arms are rounded off at the front portions of their outer ends, while the said arms are given a transverse downward and forward inclination. The arms are adapted for smoothing the ridges between rows and may have wear-plates upon their under faces.

It is evident that by shifting the levers 25 the disk cutters may be made to stand at any desired angle to the row of corn under cultivation, causing the dirt to be hilled up to a greater or less extent around the roots thereof. Links 30 are attached to the front portion of the runners, and the said links are furthermore connected with a draft-chain 31 or other draft device.

Having thus described my invention, I claim as new and desire to secure by Letters Patent—

1. In a cultivator, the combination, with runners and means for connecting the runners, the runners being provided at their rear ends with recesses in their under surfaces and with horizontal slots above the recesses, of spindles provided with T-heads, the said spindles being passed through the horizontal slots in the runners, boxes in which the heads of the spindles are mounted to turn, disk cutters held to turn on the said spindles, shifting levers, and connections between the shifting levers and the spindles, as and for the purpose specified.

2. In a cultivator, the combination, with runners having their rear extremities inwardly inclined and their under rear portions provided with recesses, each runner at the rear being further provided with a horizontal slot extending through from side to side, of boxes secured to the inner faces of the runners at the rear, spindles having T-heads, the head portions of the spindles being mounted to turn in the said boxes, the body portions of the spindles extending outwardly through the slots in the runners, disk cutters mounted to turn upon the spindles, having concaved inner and convexed outer faces, shifting levers fulcrumed upon the runners, locking devices for the said levers, and a link connection between each of the said levers and one of the said spindles, whereby the spindles may be adjusted laterally and held in the adjusted position, as and for the purpose specified.

3. In a cultivator, the combination of a runner having at its rear end a horizontal slot, the walls of which diverge outward from the inner side of the runner, a spindle capable of swinging through the horizontal slot and forming at its inner end a transverse head mounted to rock in the runner and located at the inner end of the horizontal slot, a cultivating-tool carried on the spindle, and means for adjusting and holding the spindle, substantially as described.

GEORGE McDOUGALL.

Witnesses:
JOHN MOORE,
WM. IRWIN.